United States Patent [19]

Schleicher

[11] Patent Number: 5,451,091
[45] Date of Patent: Sep. 19, 1995

[54] LIFTING ROOF OR SLIDING-LIFTING ROOF FOR VEHICLES

[75] Inventor: Bernd Schleicher, München, Germany

[73] Assignee: Webasto Karosseriesysteme GmbH, Stockdorf, Germany

[21] Appl. No.: 265,796

[22] Filed: Jun. 27, 1994

[30] Foreign Application Priority Data

Jul. 1, 1993 [DE] Germany ............. 43 21 915.2

[51] Int. Cl.$^6$ ................................. B60J 7/22
[52] U.S. Cl. ...................... 296/217; 454/129; 49/71
[58] Field of Search .......... 296/216, 217; 454/128, 454/129, 134, 217; 160/40; 49/71

[56] References Cited

U.S. PATENT DOCUMENTS

| | | | |
|---|---|---|---|
| 3,082,817 | 3/1963 | Merrill | 160/40 |
| 3,195,192 | 7/1965 | Neisewander | 160/40 X |
| 4,018,476 | 4/1977 | Lutz et al. | 49/63 X |
| 4,089,557 | 5/1978 | Leiter | 49/71 X |
| 4,656,785 | 4/1987 | Yackiw | 49/489.1 X |
| 4,709,959 | 12/1987 | Paerisch et al. | 296/217 |

FOREIGN PATENT DOCUMENTS

| | | | |
|---|---|---|---|
| 142314 | 5/1985 | European Pat. Off. | 49/489.1 |
| 3722361 | 1/1989 | Germany | 296/217 |
| 3741902 | 6/1989 | Germany . | |
| 4104446 | 8/1992 | Germany | 296/217 |
| 709661 | 6/1954 | United Kingdom | 49/489.1 |
| 2212768 | 6/1991 | United Kingdom . | |

Primary Examiner—Dennis H. Pedder
Attorney, Agent, or Firm—Sixbey, Friedman, Leedom & Ferguson; David S. Safran

[57] ABSTRACT

Lifting roof or sliding-lifting roof for vehicles with a rigid cover which can be lifted and lowered or lifted, lowered and retracted to open and close a roof opening provided in a stationary roof panel. For at least partial covering of edge gaps formed between lateral edges of the cover and the roof panel when the cover is lifted, strip-shaped lateral shields project outward and downward from the cover at both sides of the cover. These lateral shields are formed of a compressible foam material.

19 Claims, 3 Drawing Sheets

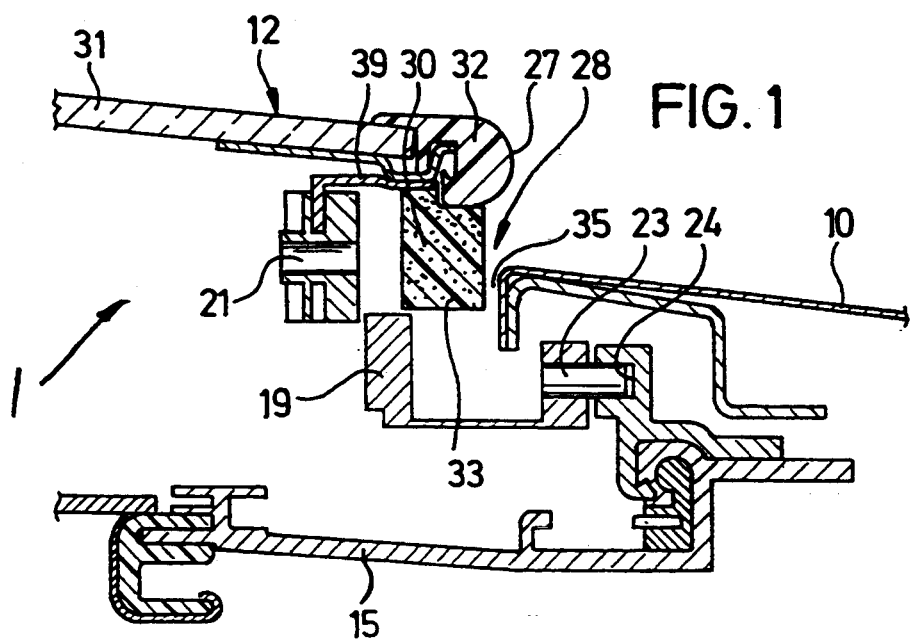
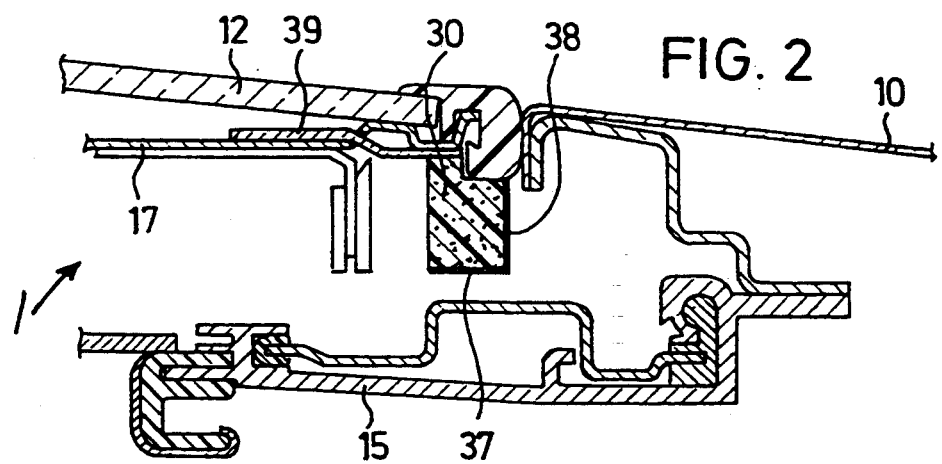
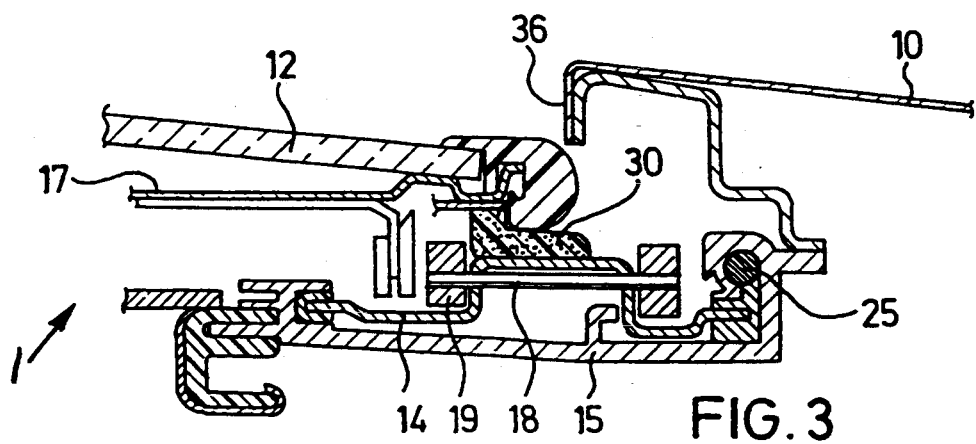

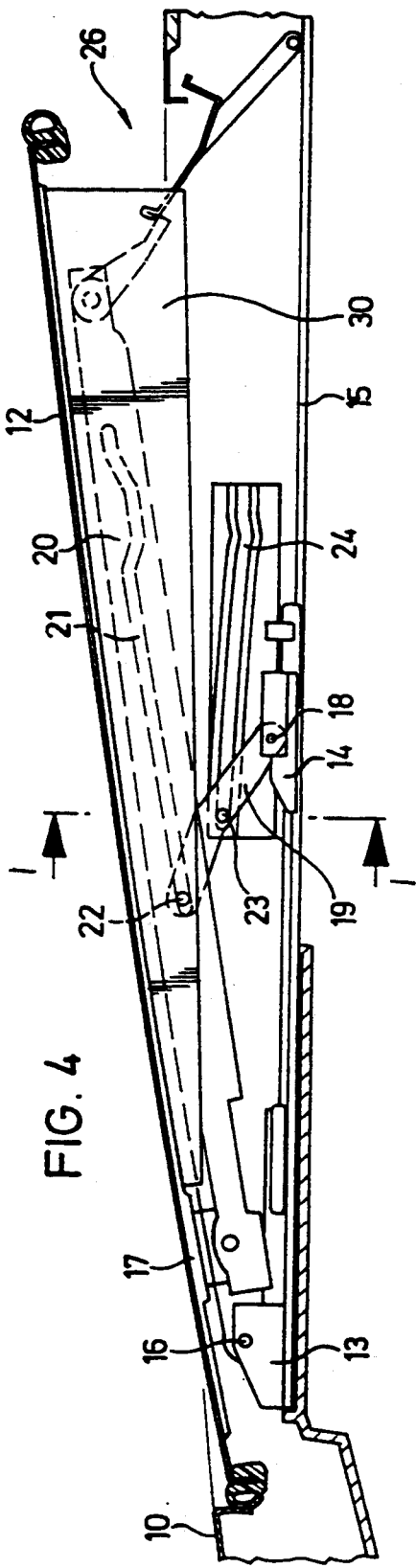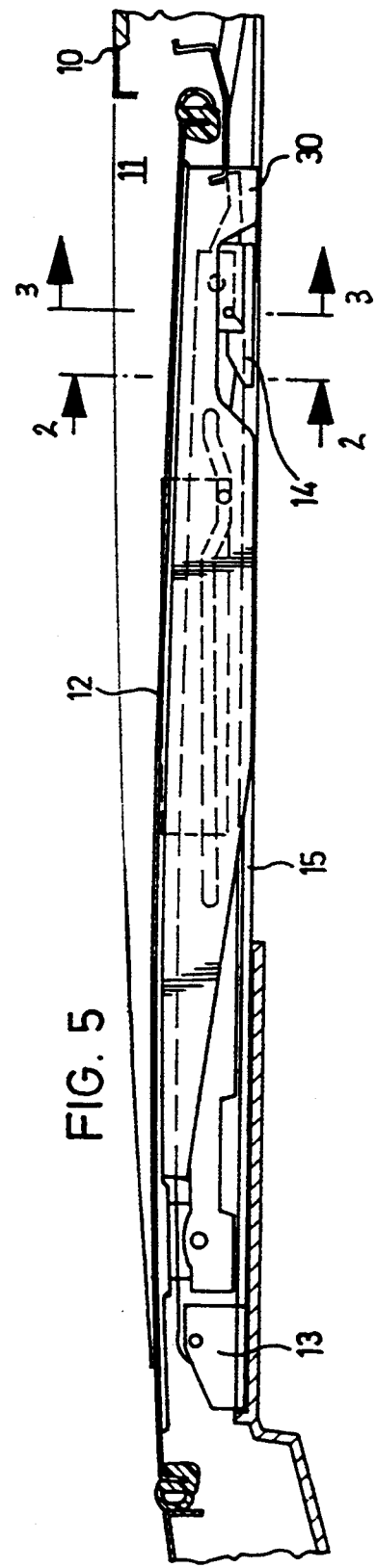

LIFTING ROOF OR SLIDING-LIFTING ROOF FOR VEHICLES

BACKGROUND OF THE INVENTION

1. Field of the Invention

The invention relates to a lifting roof or sliding-lifting roof for vehicles with a rigid cover, which can be lifted and lowered or lifted, lowered and retracted to open and close a roof opening provided in a stationary roof panel, and with strip-shaped lateral shields, which are attached projecting outward and downward from the cover for at least partial covering of edge gaps, which are formed between the lateral edges of the cover and the roof panel, on both sides of the cover, when the cover is lifted.

2. Description of Related Art

A vehicle roof of this type is known from German Patent Application No. 37 41 902 A1, in which plastic lateral shields with a sword-like outside contour are provided which are rigid near the cover and flexible near their free end as a result of differing cross-section areas. Also, from U.S. Pat. No. 4,709,959, lateral shields for sliding-lifting roofs are known, whose lower edge area is flexible and consists of a flat rubber or plastic strip, while the upper part of the shields is preferably rigid. As a whole, rigid lateral shields are known from, among others, U.S. Pat. Nos. 4,089,557 and 4,018,476, and UK Patent GB 2 212 768.

With the use of rigid lateral shields, the level of the shield, and thus also its action (especially as regards the aesthetics and noise reduction when the cover is raised), is limited by the overall height of the roof or of the roof frame. Above all, with vehicle roofs with a flat construction, this entails problems that can only partially be removed by making the lower end of the shield flexible.

SUMMARY OF THE INVENTION

The primary object of the present invention is to provide a lifting roof or sliding-lifting roof for vehicles, in which it is assured that the lateral edge gaps between the lateral edges of the cover and the roof panel, that develop when the cover is raised, are covered effectively even if the lifting roof or sliding-lifting roof has an especially low profile.

With a lifting roof or sliding-lifting roof of the initially-mentioned type, this object is achieved according to the invention by forming the lateral shields of a compressible foam material.

Lateral shields made of a compressible foam material can be compressed into a small space when the cover is lowered. The compressed lateral shield made of foam material changes its width dimension, relative to the noncompressed state, significantly less than is the case in a partially rigid, partially flexible lateral shield, whose flexible part is bent laterally when the cover is lowered. This is attributable to the fact that, in a lateral shield made of compressible foam material, the shield cross section is reduced during compression, while the known lateral shields have basically the same cross sectional size in all cover positions.

In a preferred further configuration according to the invention, the lateral shields are arranged essentially flush with the respective cover edge. This results in an especially effective noise reduction, without the danger of paint defects or the like existing in the foam lateral shield at the edge of the roof opening, as the latter is the case with shields that are rigid over at least a part of their height.

The lateral shields are suitably dimensioned so that the foam material is stress-relieved at least when the cover is raised, and the lateral shields cover at least a sizeable part of the edge gaps between the cover and roof panel.

The fastening of the lateral shields can take place, e.g., by gluing with the cover or a part slaved to the lifting and lowering movements of the cover. However, a shield support can also be molded onto the shield, which, for its part, is attached to the cover or a slaved part in the lifting and lowering movements of the cover, for example, by stapling.

In accordance with another feature of the invention, the underside of the lateral shields can be provided with a friction-reducing layer. As a result, relative movements between the shield and parts of the movement mechanism of the cover are facilitated, especially during the process of lowering the cover.

The pores of the foam material are preferably closed on the side facing the respective lateral edge of the roof opening, for example, by the lateral shields on this side being provided with a smooth, closed layer. As a result, a soiling of the lateral shields is prevented.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 shows a partial cross section of a sliding-lifting roof with a pushed-out cover viewed along line 1—1 of FIG. 4;

FIG. 2 is a partial cross section of the sliding-lifting roof along line 2—2 of FIG. 5 with the cover closed;

FIG. 3 is a partial cross section of the sliding-lifting roof with the cover lowered under the roof panel, taken along line 3—3 of FIG. 5;

FIG. 4 is a longitudinal section through the sliding-lifting roof with the cover raised;

FIG. 5 is a longitudinal section through the sliding-lifting roof with the cover lowered.

DETAILED DESCRIPTION OF THE PREFERRED EMBODIMENTS

Figure 6:
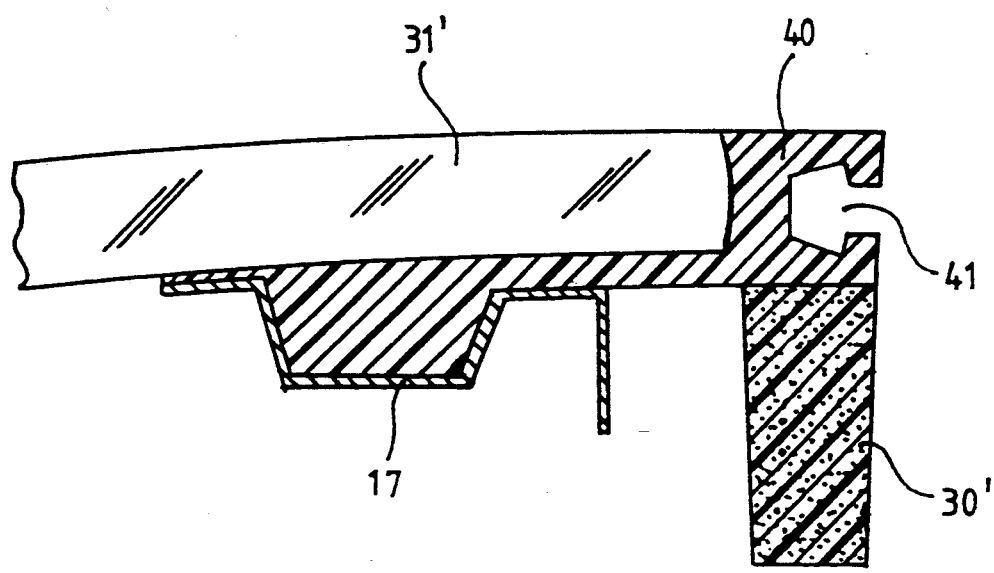
FIG. 6 is a partial cross section of a modification form for the cover of the FIG. 1 sliding-lifting roof.

The sliding-lifting roof 1 has mirror-image symmetry with reference to a central longitudinal axis of the roof. Thus, in the following description, the features shown and described for one side of the roof are the same for the other, unillustrated, side of the roof. The terms "front" and "rear" relate to the normal driving direction of the vehicle.

In a stationary roof panel 10, a roof opening 11 is made, which can be selectively closed or at least partially opened by a rigid cover 12. The cover displacement movements are produced by a movement mechanism, which includes a front sliding block 13 and a rear sliding block 14 (FIGS. 4 & 5), which can be moved in the lengthwise direction of the vehicle along a longitudinal guideway that is fixed to the roof and is formed by a slide rail 15. Front sliding block 13 carries a pivot bearing 16 for pivotally coupling of cover 12 thereto, via a cover support 17 located on the underside of the cover 12, for movement about a pivot axis lying near the front edge of cover 12 and running crosswise to the sliding direction of the cover 12. Rear sliding block 14 is connected by a pivot bearing 18 with one end of a lever 19, which can be pivoted around a crosswise running pivot axis. The other end of lever 19 is pivotally connected with cover 12 in a manner which enables it to be displaced for a limited distance in the lengthwise direction of the cover. For this purpose, a link 20 is attached to the underside of the cover, in which a guideway 21 running in the lengthwise direction of the cover is provided. A pin 22 fastened on the cover-directed end of lever 19 rotatably engages in guideway 21 and can be moved along guideway 21. A pin 23 is tightly connected with lever 19 and acts together with a guideway 24 that is fixed relative to the stationary roof panel 10 to swing lever 19 as a function of the movements of the rear sliding block 14. A drive cable 25 is connected with rear sliding block 14 and with a driving pinion of a crank handle or a power drive.

Cover 12 can be pushed out by the movement mechanism so that the rear edge of the cover is above the height of the stationary roof panel 10 (FIGS. 1 and 4) to form a ventilation gap 26 in the area of the rear edge of roof opening 11. In the closed position (FIG. 2), cover 12 is essentially flush with stationary roof panel 10. The movement mechanism also can produce a lowering of the cover 12 in the area of its rear edge so as to be lower than the stationary roof panel 10 (FIGS. 3 and 5), and then, to move the cover toward the rear under roof panel 10 to an unillustrated fully open position. The design and mode of operation of the movement mechanism can, moreover, be the same or similar to the design and the mode of operation of the movement mechanism known from German Patent Application 39 30 756 A1, or alternatively, various other movement mechanisms could be used, such as the mechanism described in U.S. Pat. No. 4,679,846. Therefore, since the particular movement mechanism details, themselves, form no part of this invention, no further explanation thereof is necessary to an understanding of the present invention.

With cover 12 lifted up (FIGS. 1 and 4), lateral edge gaps 28 are formed between lateral edges 27 of cover 12 and roof panel 10. These edge gaps 28 are covered with the help of strip-shaped lateral shields 30, both for aesthetic and for airflow reasons (wind noises and the like). Lateral shields 30 are attached to cover 12 projecting outward and downward from the latter. The shields 30 lie, preferably, essentially flush with the respective cover edge 27, which is formed, in the embodiment illustrated in FIGS. 1 and 2, by a seal 32 which extends around a cover panel 31. Lateral shields 30 are matched to the shape of edge gap 28 and are, therefore, essentially wedge-shaped in the lengthwise direction as shown in FIG. 4. In the embodiment shown, the arrangement is made so that, in the case of completely pushed-out cover 12, lateral shields 30 extend a short distance (e.g., 1 to 6 mm) into the roof opening 11 as can be seen from FIGS. 1 and 4. The body 33 of lateral shields 30 is preferably formed of a sound-absorbent plastic. Among others, a polyurethane-ether foam with a specific weight of about 30 kg/m³ has proved especially suitable. As an alternative material, a closed-cell polyethylene (PE) foam is also suitable. This material is stress-relieved at least when cover 12 is pushed out (FIGS. 1 and 4). On the other hand, when cover 12 is lowered, the lateral shields 30, are compressed between cover 12 and parts that extend under the lateral edges of roof opening 11, i.e., especially sliding block 14 and slide rail 15.

Since the foam element 33 of the lateral shields 30 is relatively soft, a horizontal gap 35 between the lateral outside surface of the lateral shield and side edge 36 of roof opening 11, formed, for example, by a bent edge of the roof panel 10, can be kept small (for example, in the range of from 0 to 3 mm), without defects in paint work on the lateral edges of the roof opening having to be feared or without excess friction between the lateral shields 30 and the lateral edges 36 of roof opening 11 resulting because of unavoidable dimensioning and installation tolerances. The underside of the lateral shields 30 can be provided with a friction-reducing layer 37 to facilitate relative movement between the lateral shields 30 and the stationary components of the movement mechanism (especially during the lowering and retraction of the cover).

In addition, it is suitable to close the pores of the foam material on the side facing the respective lateral edge 36 of the roof opening 11, for example, by this area of the lateral shields being provided with a smooth, closed layer 38. This can be achieved, for example, by a sheathing of a polyurethane-ether foam with a water-soluble paint or a polyurethane coating based on dispersion. As an alternative to this, an oleophobic or hydrophobic impregnation of the polyurethane-ether foam is also possible. As a result, in the operation of the vehicle, dirt can be prevented in a simple way from settling on the lateral shields. When using a closed-cell polyethylene (PE) foam, layer 38 can be dispensed with.

Lateral shields 30 can be glued to cover 12 or to a part slaved to the lifting and lowering movements of the cover, especially cover support 17. But, in the illustrated embodiment, a shield support 39 is specifically provided for supporting the lateral shields 30. This shield support 39 is attached to the lateral shields 30, and for example, clipped to the cover support 17. However, it goes without saying that, also, other ways of attaching the lateral shields 30 are suitable. For example, a connecting of the lateral shields 30 with links 20 is possible. In addition, the lateral shields 30 can be positively and/or nonpositively locking in corresponding receiving devices of seal 32, as is known in principle from the initially mentioned German Patent Application DE 37 41 902 A1. Optionally, the lateral shields can also be molded onto the seal 32. Another alternative consists in molding a lateral shield 30' onto a frame 40 made of polyurethane (PU) foam surrounding a glass cover 31' (FIG. 6). This can take place, preferably, in a second step in the same mold after foaming of the frame 40 by exposure of a hollow space, corresponding to lateral shields 30', in the mold-half in question by removing a corresponding mold ridge or core and then casting the flexible material in this hollow space. On its outer peripheral edge, frame 40 is provided with an undercut groove 41 to accommodate a seal (not shown).

In the illustrated embodiments, lateral shields 30, 30' are dimensioned so that edge gaps 28 are completely covered. But, in some applications, it can be sufficient if edge gaps 28 are only partially covered, especially over a sizeable part. Optionally, lateral shields 30 can also be, to some extent, wrapped around the rear nose radius of cover 12.

While a sliding-lifting roof is illustrated in the drawings, the explained design of the lateral shields is easily suitable also for lifting roofs, i.e., roofs in which the cover can be pushed out, but cannot be moved in the lengthwise direction of the vehicle. Thus, while various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Roof for vehicles with a rigid cover which can at least be lifted and lowered to open and close a roof opening provided in a stationary roof panel and having strip-shaped lateral shields which project downward from the cover for at least partial coveting of edge gaps formed, when the cover is lifted, between lateral edges of the cover and the stationary roof panel on both sides of the cover; wherein the lateral shields are formed of a compressible foam material as a means for reducing a compressed height of the lateral shields, at least at a rear portion thereof, in a lowered position of the rigid cover to an amount substantially less than a distance between the stationary roof panel and an underlying guide track for the rigid cover that is disposed on a frame attached to an underside of the stationary roof and along which the rigid panel is displaceable, said distance being substantially that of an uncompressed height of the lateral shields for reducing the overall height of the roof.

2. Roof according to claim 1, wherein the lateral shields are located essentially laterally flush with a respective cover edge.

3. Roof according to claim 1, wherein the lateral shields are dimensioned so that, when the cover is lifted, the foam material is stress-relieved and the lateral shields cover at least a major portion of the edge gaps between cover and roof panel.

4. Roof according to claim 3, wherein the lateral shields are dimensioned so as to be compressed between the cover and stationary parts lying under lateral edges of the roof opening when the cover is lowered.

5. Roof according to claim 1, wherein the lateral shields are dimensioned so as to be compressed between the cover and stationary parts lying under lateral edges of the roof opening when the cover is lowered.

6. Roof according to claim 1, wherein the lateral shields are connected with a part which follows the lifting and lowering movements of the cover.

7. Roof according to claim 1, wherein the lateral shields are provided with a molded-on shield support which is attached to a part which follows the lifting and lowering movements of the cover.

8. Roof according to claim 1, wherein an underside of the lateral shields is provided with a friction-reducing layer.

9. Roof according to claim 1, wherein pores of the foam material are closed, at least on a side facing a respective lateral edge of the roof opening.

10. Roof according to claim 1, wherein the lateral shields are provided with a smooth, closed layer on a side facing a respective lateral edge of the roof opening.

11. Roof according to claim 1, wherein the foam material is a polyurethane (PU)-ether foam.

12. Roof according to claim 1, wherein the foam material is a polyethylene (PE) foam.

13. Roof according to claim 1, wherein the roof is a sliding and lifting roof in which the cover is mounted so as to be rearwardly slidably retractable after being lowered from a closed position thereof.

14. Roof according to claim 13, wherein the lateral shields are located essentially laterally flush with a respective cover edge.

15. Roof according to claim 13, wherein the lateral shields are dimensioned so that, when the cover is lifted, the foam material is stress-relieved and the lateral shields cover at least a major portion of the edge gaps between cover and roof panel.

16. Roof according to claim 15 wherein the lateral shields are dimensioned so as to be compressed between the cover and stationary parts lying under lateral edges of the roof opening when the cover is lowered.

17. Roof according to claim 13, wherein the lateral shields are connected with a part which follows the lifting, lowering and retracting movements of the cover.

18. Roof according to claim 17, wherein an underside of the lateral shields is provided with a friction-reducing layer.

19. Roof according to claim 14, wherein pores of the foam material are closed, at least on a side facing a respective lateral edge of the roof opening.

* * * * *